No. 632,833. Patented Sept. 12, 1899.
W. A. CHENEY.
WAVE MOTOR.
(Application filed Dec. 12, 1898.)
(No Model.)
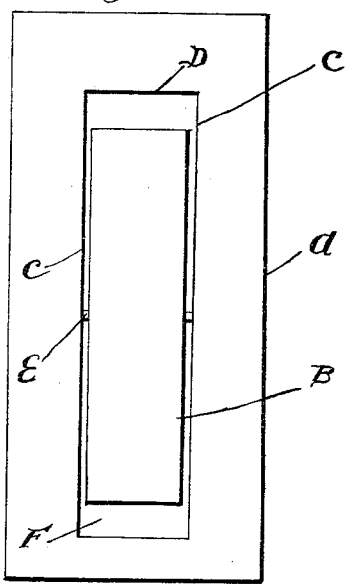
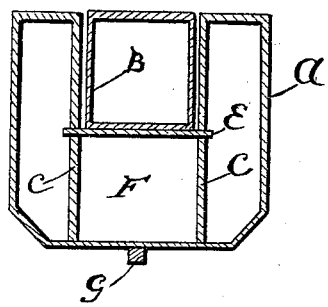
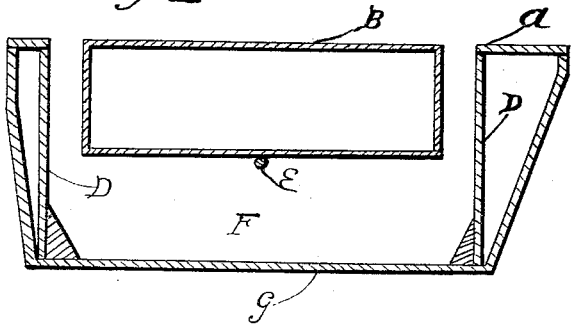
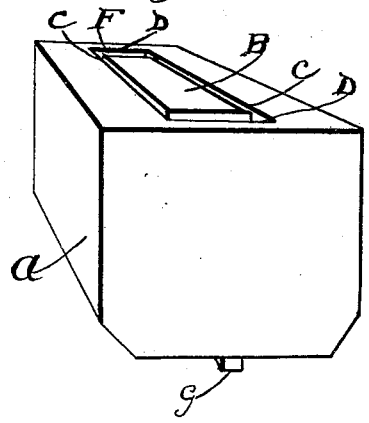
WITNESSES:
John C. Perry
J. A. Patten
William A. Cheney INVENTOR
BY Harvey D. Cheney
ATTORNEY.
THE NORRIS PETERS CO., PHOTO-LITHO., WASHINGTON, D. C.

UNITED STATES PATENT OFFICE.

WILLIAM A. CHENEY, OF LOS ANGELES, CALIFORNIA.

WAVE-MOTOR.

SPECIFICATION forming part of Letters Patent No. 632,833, dated September 12, 1899.

Application filed December 12, 1898. Serial No. 699,100. (No model.)

*To all whom it may concern:*

Be it known that I, WILLIAM A. CHENEY, a citizen of the United States, residing at Los Angeles, in the county of Los Angeles, State of California, have invented a new and useful Wave-Motor, of which the following is a specification.

The object of my invention is to provide a wave-motor that will generate the greatest amount of power from the rise and fall of waves and at the same time be sufficiently seaworthy and buoyant to withstand the action of the waves and wind and maintain its anchorage under all reasonable conditions.

With such an object in view my invention consists in the peculiar manner of constructing and arranging the different parts, as will be described hereinafter and pointed out in the drawings and claim.

In the accompanying drawings, Figure 1 represents a top view; Fig. 2, a vertical longitudinal section of the same; Fig. 3, a vertical lateral section. Fig. 4 is a perspective view of the machine with parts assembled.

The reference-letter A represents the outside containing float or boat, provided with two longitudinal bulkheads C, extending from the deck to the bottom of the boat, and two lateral bulkheads D, extending the same distance, these bulkheads being so placed and joined as to form a water-tight tank F. G is the bottom or keel of the boat. The interior or oscillating float B is made hollow, so as to render it buoyant. The float B is rigidly secured to and oscillates on the pivot E, which is placed at an equal distance from each end of the float B. The pivot oscillates in trunnion-bearings secured to the bulkhead C.

Having described my invention in detail, I will now describe its operation.

The outer float or boat A is floated head on to the waves of the ocean or other turbulent body of water. The longitudinal tank F contains water in quantity sufficient to bring its level up to or slightly above the bottom of the oscillating float B. Now it will at once be apparent that when the outer float or boat A is caused to pitch or oscillate by the action of the waves under its bow and bottom the water contained within the tank F will not oscillate in unison with the boat A, but will maintain a horizontal level at its surface. Now the inner or oscillating float B will also maintain a horizontal position, owing to the fact of its buoyancy and that its position is regulated by the surface of the water in the tank F. For the reasons given above it will be seen that the inner float B forms a relatively stationary point to the outer float A, and with every oscillation of the outer float the relative positions of the two floats change accordingly.

Any of the well-known methods of utilizing the power produced by the relative change of position of the floats A and B may be adopted, such as compressed air or water-pressure, or power may be taken off direct from the pivot E or from any part of the inner float B and a continuous rotary motion obtained by the use of a fly-wheel. However, the above-suggested methods of utilizing the power of my invention do not form a subject for which I herein apply for a patent.

I am aware that wave-motors have been invented and patented heretofore which utilize the power derived from the rise and fall of two or more independent floats, each float forming a separate boat and connected by levers and other mechanical means, securing from their arrangement a relative difference of position; but I am not aware that the combination of floats, pivot, and water-tank which I have herein described have been used together. Hence I do not claim the combination of two or more floats which derive their power from the independent rise and fall of each, broadly; but What I do claim, and desire to secure by Letters Patent of the United States, is—

The combination in a wave-motor, of a pivoted buoyant float B, capable of oscillating on a pivot in bearings fixed to the bulkhead C, with an outer float or boat A, with the longitudinal water-tank F, in which the oscillating float B floats and oscillates, substantially as described herein.

In testimony whereof I affix my signature in the presence of two witnesses.

WILLIAM A. CHENEY.

Witnesses:
 JOHN C. PERRY,
 F. A. PATTEE.